(12) United States Patent
Mallick et al.

(10) Patent No.: US 10,360,085 B1
(45) Date of Patent: Jul. 23, 2019

(54) METHOD AND APPARATUS FOR IDENTIFYING PROCESS USE ON STORAGE ARRAY RESOURCES

(71) Applicant: EMC IP Holding Company LLC, Hopkinton, MA (US)

(72) Inventors: Sanjib Mallick, Bangalore (IN); Maneesh Pusalkar, Pune (IN); G Vinay Rao, Bangalore (IN); Subin George, Framingham, MA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 290 days.

(21) Appl. No.: 15/390,949

(22) Filed: Dec. 27, 2016

(51) Int. Cl.
  G06F 3/00 (2006.01)
  G06F 9/54 (2006.01)
  G06F 9/455 (2018.01)
  G06F 9/50 (2006.01)
  G06F 3/06 (2006.01)

(52) U.S. Cl.
  CPC ............ G06F 9/545 (2013.01); G06F 3/0619 (2013.01); G06F 3/0665 (2013.01); G06F 3/0689 (2013.01); G06F 9/45558 (2013.01); G06F 9/5077 (2013.01); G06F 2009/4557 (2013.01); G06F 2009/45579 (2013.01)

(58) Field of Classification Search
  None
  See application file for complete search history.

(56) References Cited

U.S. PATENT DOCUMENTS 9,774,615 B1 * 9/2017 Roundy .............. H04L 63/1425
2016/0092136 A1 3/2016 Balakrishnan et al.

OTHER PUBLICATIONS

SolarWinds *Storage Resource Monitor User Guide*, Version 6.3, Aug. 30, 2016 (284 pages).

* cited by examiner

*Primary Examiner* — Midys Rojas
(74) *Attorney, Agent, or Firm* — Anderson Gorecki LLP (57) ABSTRACT

A method and apparatus for identifying process use on storage array resources is provided. A first process (e.g. an IO driver such as an MPIO driver) on each host collects process information of application processes running on that host. The process/device information is forwarded to the storage array where it is added to a process correlation data structure and correlated with assigned devices of the storage array. The host name that provided the process information is also added to the process correlation data structure. A name of the application is also correlated to the process name in the process correlation data structure. The date the device was last used is periodically updated in the process correlation data structure. The process correlation data structure may then be used to identify devices that have not recently been used and to identify the host, application, and process that uses the devices.

18 Claims, 5 Drawing Sheets

| Device 144 | Process or VM/process 146 | Application 148 | Host name 150 | Date 152 |
|---|---|---|---|---|
| 1 | EXC1 EXC2 | Microsoft Exchange | 1 | 5 days |
| 2 | EXC.log | Microsoft Exchange | 1 | 1 day |
| 3 | Oracle.db | Oracle | 2 | 24 months |
| 4 | Oracle.log | Oracle | 2 | 24 months |
| 5 | VM1 | Linux/Oracle | 3 | 1 day |
| 5 | VM2 | Windows/Exchange | 3 | 22 months |
| 5 | VM3 | Linux/User created app. | 3 | 35 days |
| 6 | VMID:TT | Linux/User created app. | 4 | 35 months |
| 7 | VMID:TN | Linux/Oracle | 4 | 1 day |
| 8 | - | - | - | 1 month |
| 9 | VMID:TV | Linux/Oracle | 5 | 1 day |
| 10 | VMID:TW | Linux/User created app. | 5 | 1 day |

FIG. 5

METHOD AND APPARATUS FOR IDENTIFYING PROCESS USE ON STORAGE ARRAY RESOURCES

CROSS REFERENCE TO RELATED APPLICATIONS

None

BACKGROUND

This disclosure relates to storage systems and related devices and methods, and, more particularly, to a method and apparatus for identifying process use on storage array resources.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

All examples and features mentioned below can be combined in any technically possible way.

In one aspect, a non-transitory tangible computer readable storage medium is provided that has stored thereon a computer program for implementing a method of identifying process use on storage array resources. The computer program includes a set of instructions which, when executed by a computer, cause the computer to perform a method including the steps of collecting, by an Input/Output (IO) driver executing in kernel space, a list of process names of processes executing in user space from IO requests by the processes, correlating, by the IO driver, the process names with storage devices used by the processes, and forwarding, by the IO driver to the storage array, process/device correlation information correlating the process names and devices used by the associated processes.

In certain implementations, the IO driver is a Multi-Path Input/Output (MPIO) driver.

In some implementations, the step of forwarding includes generating and transmitting a vendor unique LOG SELECT command.

In certain implementations, the storage devices are logical volumes of data storage offered by the storage array.

In some implementations, the method further includes the step of collecting a list of Virtual Machines executing on the computer and processes executing on the virtual machines.

In certain implementations, the method further includes correlating, by the IO driver, Virtual Machine IDs associated with the Virtual Machines, processes executing on the Virtual Machines, and storage devices used by the Virtual Machines, and forwarding, by the IO driver to the storage array, Virtual Machine/process/device correlation information correlating the Virtual Machine IDs, process names of the processes executing on the Virtual Machines, and the devices used by the processes executing on the Virtual Machines.

In another aspect, a non-transitory tangible computer readable storage medium is provided that has stored thereon a computer program for implementing a method of identifying process use on storage array resources. The computer program includes a set of instructions which, when executed by a computer, cause the computer to perform a method includes the steps of receiving, by the storage array from hosts connected to the storage array, process/device correlation information identifying processes on the hosts and correlating the identified processes with storage devices offered by the storage array, adding the process/device correlation information to a process correlation data structure, adding host identification information to the process correlation data structure, and adding device use data to the process correlation data structure.

In certain implementations, the method further includes deducing application names for processes based on the process information.

In some implementations, the method further includes receiving a query on the process correlation data structure; and outputting a query response to the query, the query response containing information derived from the process correlation data structure.

In certain implementations, the query includes a query for devices not accessed for more than a query parameter number of days, and the query response includes a selected subset of storage devices and corresponding host and process information for the selected subset of storage devices.

In some implementations, the method further includes receiving, by the storage array from the hosts connected to the storage array, Virtual Machine correlation information identifying Virtual Machines executing on the hosts and correlating the identified Virtual Machines with storage devices offered by the storage array, and adding the Virtual Machine/device correlation information to the process correlation data structure.

In certain implementations, the Virtual Machine correlation information further includes process information about processes executing on the Virtual Machines.

DETAILED DESCRIPTION

This disclosure is based, at least in part, on the realization that it would be advantageous to provide a method and apparatus for identifying process use on storage array resources.

Figure 3:
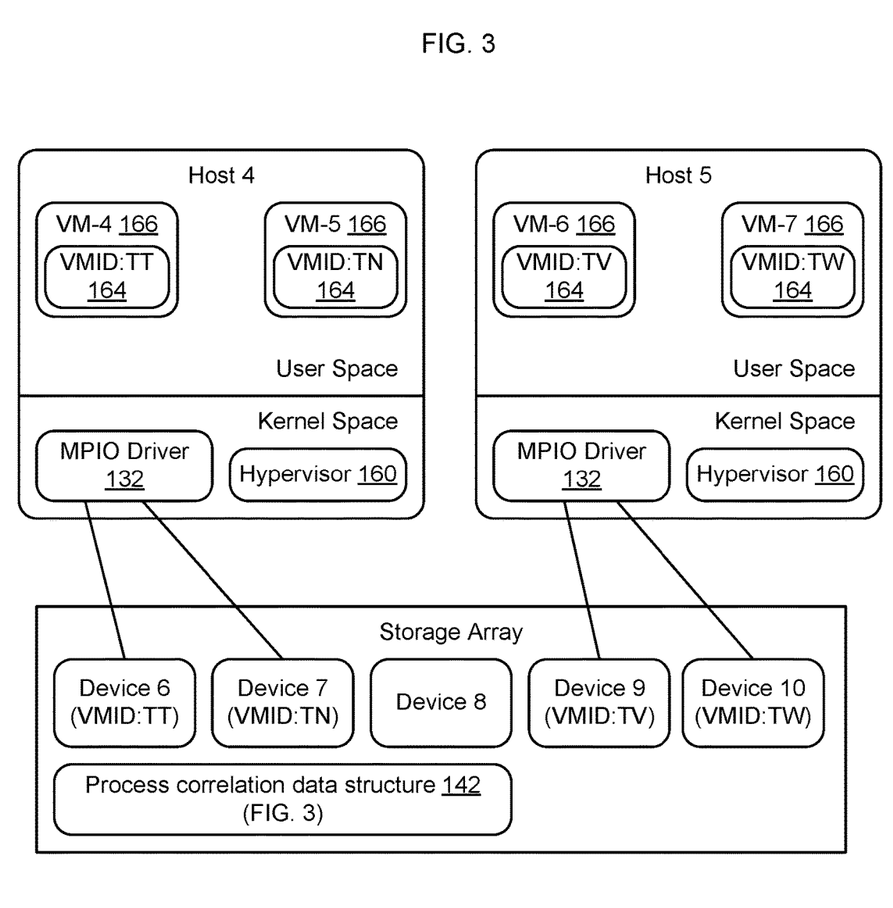

In a storage environment 100 (FIG. 1) there may be multiple storage arrays 112. Each storage array 112 may connect to hundreds of hosts 110 and contain thousands of storage devices 130. Hosts 110 may be computers/servers or virtual machine instances 166 (FIG. 3). Storage devices 130 are logical storage volumes offered to the hosts 110 and virtual machine instances 166 by the storage array 112. Each process 136 on a given host 110, or optionally several processes 136 on a given host 110, will use a particular storage device 130 offered by the storage array 112.

Since storage resources are not infinite, it is desirable to free up storage space in the storage array 112. One way in which this may be accomplished is by deleting devices 130 that are no longer in use by the hosts 110 to which they were assigned. Unfortunately it is not trivial to determine which devices 130 are no longer required and thus it can be difficult to identify candidate devices 130 for elimination. Specifically, although a storage administrator of the storage array 112 can determine that a particular storage device 130 has not been used for a period of time, the storage administrator does not know which process 136 uses that storage device 130. This complicates searching for storage devices 130 that can be eliminated from the storage array 112 to free up storage for use by other hosts 110, because non-use of a storage device 130, alone, does not mean that the storage device 130 is not needed. For example, it may be that the storage device 130 is being used for long term storage such as backup storage and, accordingly, the non-use of the storage device 130 is not itself indicative of whether the storage device 130 continues to be needed by one of the hosts 110 accessing the storage array 112.

According to an implementation, a method and apparatus for identifying process 136 use on storage array resources is provided. A first process on each host 110 collects process information of application processes 136 running in user space 116 on that host 110. In one implementation the first process is an I/O driver such as a Multi-Path Input/Output (MPIO) driver 132 in kernel space 114. The process information is forwarded to the storage array 112 where it is added to a process correlation data structure 142 and correlated with assigned devices 130 of the storage array 112. The host name that provided the process information is also added to the process correlation data structure 142. A name of the application 134 associated with the process 136 is also added to the process correlation data structure 142. The date 152 (FIG. 4) the device 130 was last used is periodically updated in the process correlation data structure 142. The process correlation data structure 142 may then be used to identify devices 130 that have not recently been used and to identify the host 110, application 134, and process 136 that uses the identified devices 130.

Figure 1:
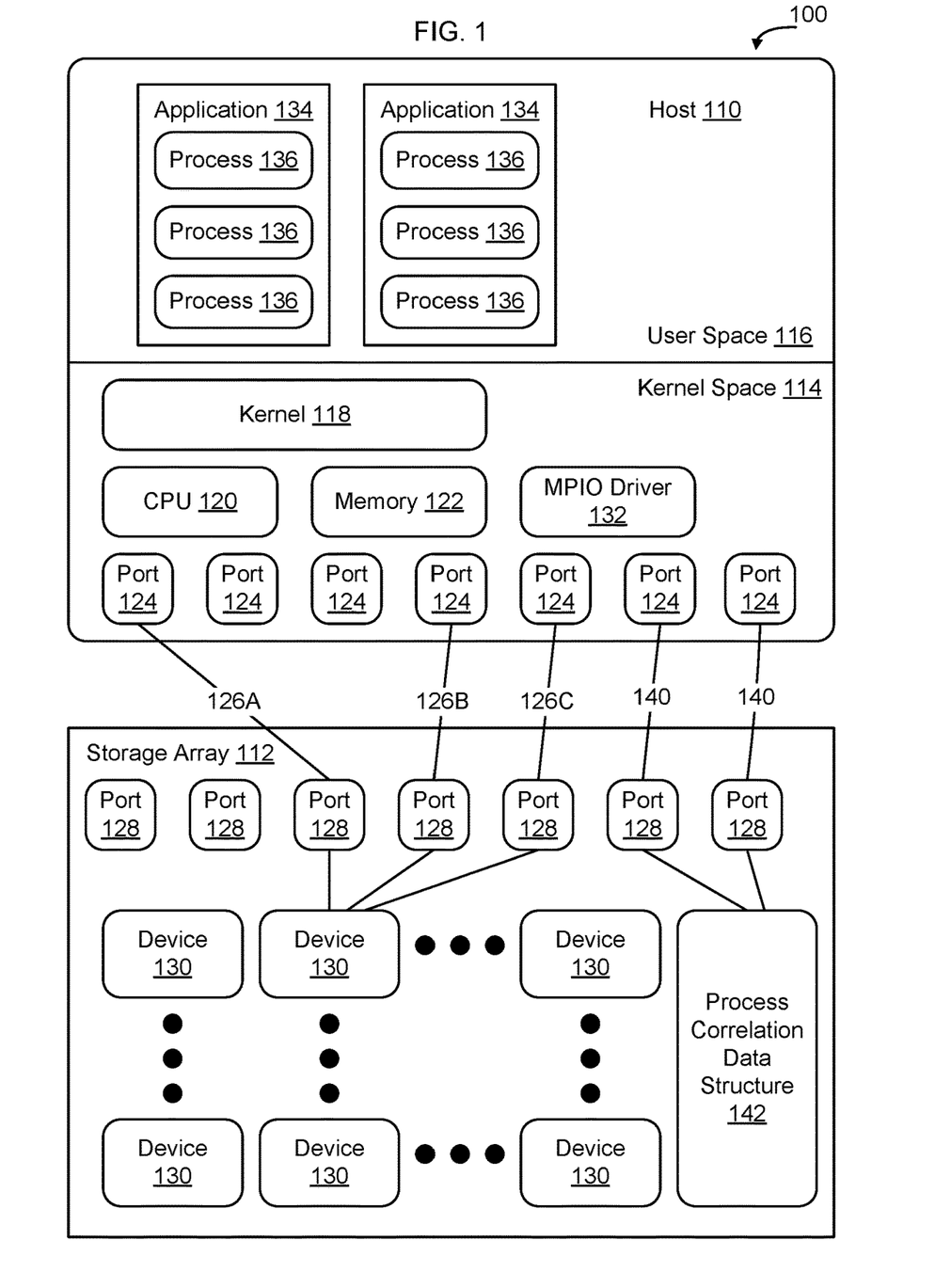
FIGS. 1-3 are functional block diagrams of an example system for identifying process use on storage array resources according to an embodiment.

FIG. 1 is a block diagram of a storage environment 100 in which a host 110 connects to a storage array 112. The storage array 112 has a large number of optical disc drives, solid state drives, and other physical storage mediums designed to store data. The storage array virtualizes the storage provided by these physical devices to present logical storage volumes "devices" for use by processes 136 running on hosts 110. As used herein, the term "device" 130 will be used to refer to a logical volume of storage capacity offered by the storage array 112. Devices 130 are also referred to as Logical Unit Numbers (LUNs), which is a number used to identify the logical storage volume in the SCSI protocol or by the Storage Area Network (SAN) protocol (e.g. Fibre Channel or iSCSI) encapsulating SCSI.

As shown in FIG. 1, the host 110 generally has kernel space 114 and user space 116. Kernel space 116 includes kernel 118. The kernel 118 is a computer application that constitutes the central core of a host's 110 operating system. It has complete control over everything that happens in the system. For example, the kernel 118 manages input/output requests from software (e.g. application 134) by translating the requests into data processing instructions for the Central Processing Unit (CPU) 120. The kernel 118 is also responsible for managing memory 122 and managing and communicating with external resources such as displays, printers, and other peripherals and, as such, is a fundamental part of the host's operating system.

The critical code of the kernel 118 is usually loaded into a protected area of memory referred to herein as kernel space 114. Executing the kernel 118 in kernel space 114 prevents the kernel 118 from being overwritten by applications 134. The kernel 118 performs its tasks, such as executing processes 136 and handling interrupts, in kernel space 114, whereas everything a user normally does, such as writing text or interacting with a database, is done via applications executing in user space 116. This separation prevents user data and kernel data from interfering with each other and is shown logically in FIG. 1 by the horizontal line separating user applications 134 from the underlying host operating system software and kernel 118. Within the host 110 the virtual memory 122 is thus divided into kernel space 114 and user space 116. The kernel space 114 of the virtual memory is reserved for running the operating system kernel 118, kernel extensions and most device drivers. In contrast, user space 116 is the memory area where application software 134 and some other drivers execute.

In an environment where the host 110 is connected to a storage array 112, the host 110 may include a plurality of storage ports 124 to provide multiple paths 126 to the storage array 112. An Input/Output (I/O) driver, such as a multipath I/O driver (MPIO driver 132) facilitates communication between the host 110 and storage array 112. Where a MPIO driver is used, the host can communicate with the storage array 112 over multiple paths 126 by selecting an optimal path to the storage array 112 for each data access operation. For example, in FIG. 1 the host 110 has three paths 126A, 1266, 126C to storage array 112. The paths connect to storage array ports 128 on storage array 112 to enable the host 110 to use any available path 126 to access device 130.

In user space 116, applications 134 execute on host 110. Each application 134, when instantiated on host 110, will start a number of processes 136 on host 110. Each process 136 that stores data in storage array 112 will have a device 130 in storage array 112 assigned to it and will access the device 130 via the MPIO driver 132. Optionally two or more processes 136 on host 110 may share a device 130 on storage array 112.

According to an implementation, a first application process collects information about processes 136 executing in user space 116. In one implementation, the first application process is an I/O driver such as a MPIO driver 132 138 executing in kernel space 114. The MPIO driver 138 collects information about the processes 136 executing in user space 116, such as the name of the process 136 executing in user space 116 from IO request generated by the process 136. The driver 138 also collects the name of the device on which the 10 was sent.

The MPIO driver 132 correlates the processes information with information about devices 130 used by the processes 138, and reports the process/device correlation information 140 to the storage array 112. The storage array 112 uses the process/device correlation information 140 to populate a process correlation data structure 142.

Figure 4:
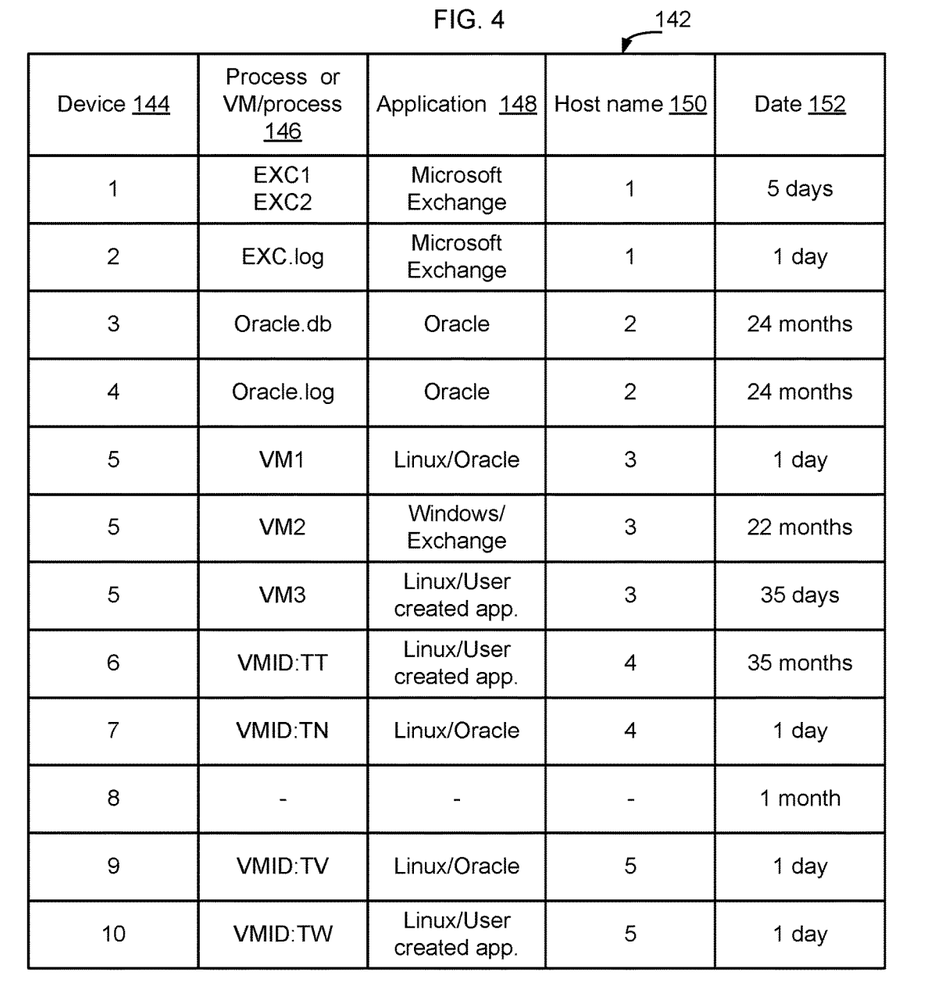
FIG. 4 is a block diagram of a process correlation data structure for use in the example system of FIGS. 1-3.

One example process correlation data structure 142 is shown in greater detail in FIG. 4. As shown in FIG. 4, in one implementation the process correlation data structure 142 is implemented as a table or relational structure correlating device information 144, process and VM/process information 146, application information 148, host name information 150, and date of last use information 152. Although the process correlation data structure 142 is shown in this implementation as a table for ease of explanation, other forms of data structures may be used as well.

In process correlation data structure 142, device information 144 and process information 146 is obtained from reports of process/device correlation information 140 from the MPIO drivers 132 on each of the hosts 110 connected to the storage array 112. In some implementations, the MPIO drivers 132 report process/device correlation information 140 to the storage array 112 whenever there is a change from the last report. In some implementations, the MPIO drivers 132 report all the process/device correlation information 140 to the storage array 112 periodically, such as daily. In some implementations, the MPIO drivers 132 report the process/device correlation information 140 to the storage array 112 whenever the host 110 is restarted or whenever the host 110 first connects to the storage array 112.

Host name information 150 in process correlation data structure 142 is known to the storage array 112 from the initial host registration process, when the host 110 first connects to the storage array 112 to obtain storage resources from the storage array 112. As the hosts 110 report process/device correlation information 140 to the storage array 112 the process information 146 in the process/device correlation information 140 is associated with host name information 150 in process correlation data structure 142.

Figure 2:
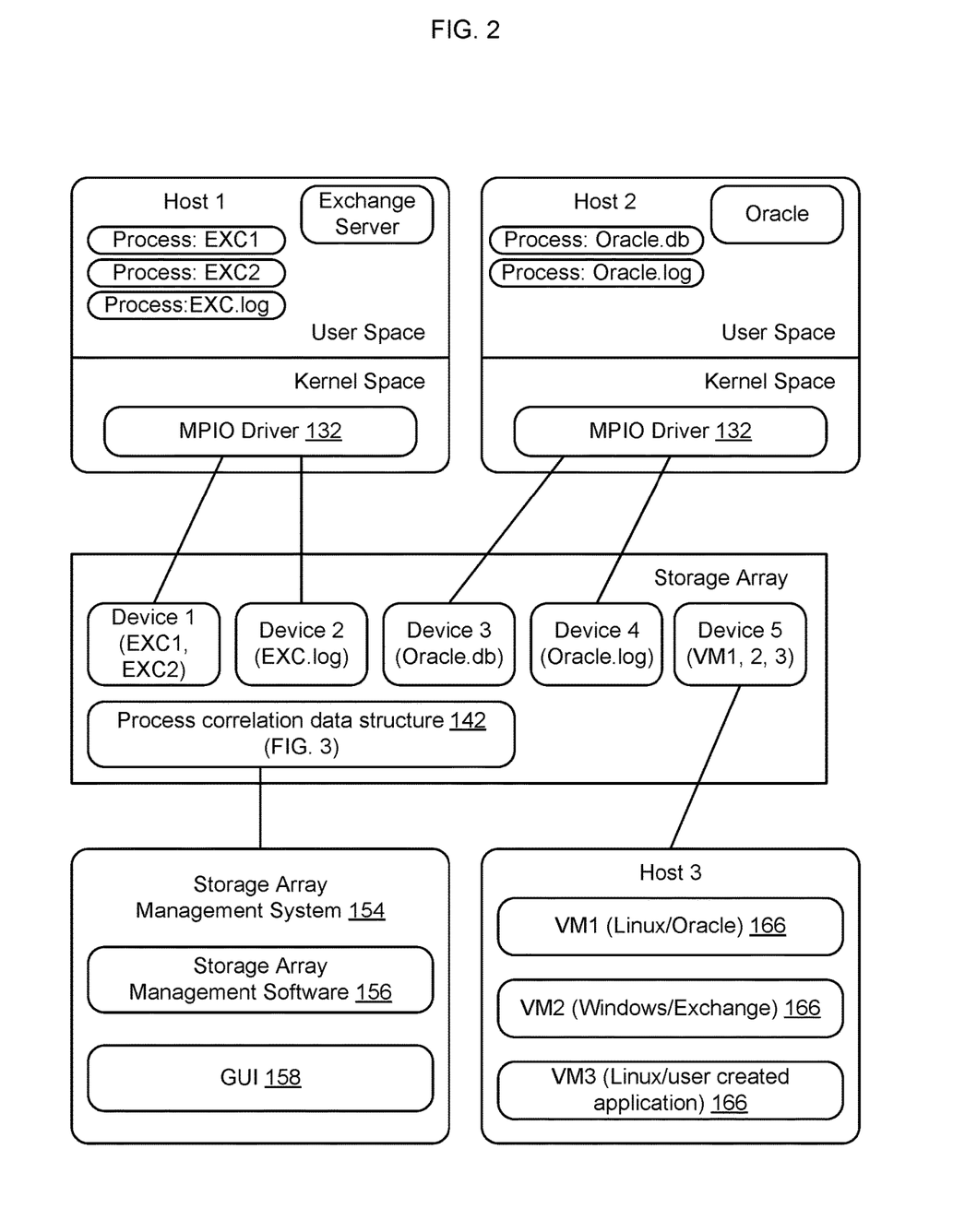

Application information 148, in one implementation, is derived from the names of the processes 136 in the process information 146. For example, over time the storage array management system 154 (FIG. 2) and/or a storage administrator will associate particular process names with particular applications. For example, the storage array management system 154 (FIG. 2) may be programmed to recognize that the process name oracle.db and oracle.log are associated with an Oracle database application. Likewise, process names EXC1, EXC2, and EXC.log are recognizable as originating from a Microsoft Exchange application. Accordingly, many of the application names in application information 148 may be inferred by the storage array management system 154 (FIG. 2) from the process names contained in process information 146. Other applications 134 may be user-specific created applications which spawn processes in user space that have names that are not recognizable to the storage array management system 154 (FIG. 2). In this instance the host 110 may be asked to provide the name of the application 134 associated with the processes 136 to enable the application information 148 in process correlation data structure 142 to be populated.

The storage array 112 keeps a log of when each device 130 is accessed. The most recent access, in one implementation, is correlated with the host information 150 as date information 152. Although in an implementation this date information 152 is shown as being incorporated in process correlation data structure 142, in another implementation the date information 152 may be separately maintained by the storage array management system 154, e.g. in an access log, and the device ID 144 may be used to key into the separately maintained store of date information 152 to obtain date information 152 as needed.

As shown in FIG. 2, a storage array management system 154 running storage array management software 156 is used to access the data contained in process correlation data structure 142. Storage array management software 156 includes a graphical user interface 158 through which a storage administrator may run queries on the process correlation data structure 142 to generate reports on usage of devices 130.

There are many types of queries that may be facilitated using process correlation data structure 142. For example, the storage array management software 156 may be used to query the process correlation data structure 142 to ascertain which processes are using each device 130 and the last time the device 130 was used. This will allow the storage administrator to ascertain which devices 130 in storage array 112 have not been used for a long time. Devices 130 that have not been used for a long time may be candidates for deletion or external backup. Further, the result will include the identity of the process 136 using the device as well as the host 110 assigned to the device. This enables the storage administrator to ascertain the purpose of the device (e.g. whether the device is used for Log storage, index files, database storage, etc.) which allows the administrator to better assign the device 130 a service level objective. Also, in the event that the storage administrator determines that the device 130 may be a candidate for deletion, having the name of the host 110 and the process 136 and application 134 assigned to the device 130 facilitates communication between the storage administrator and the host system administrator to obtain permission for deletion of the device 130. Many types of reports may be run on the process correlation data structure 142 and the invention is not limited to this one example.

In one implementation, the process correlation data structure 142 also maintains information about Virtual Machines (VMs) 166 running on hosts 110. As an example, as shown in FIG. 2, host #3 is configured to support multiple virtual machines 166. In one implementation the host 110 includes an instance of a hypervisor 160, such as the ESX™ hypervisor from VMware. Other forms of hypervisor may be used as well. The hypervisor 160 enables a single physical machine to be partitioned into multiple logical servers, referred to as virtual machines 166.

As shown in FIG. 3, where a host 110 is to support multiple virtual machines 166, the host 110 includes a hypervisor 160 and MPIO driver 132 in kernel space 114. Each virtual machine 166 running on host 110 has a VM unique ID 164 which identifies the virtual machine 166 to the storage array 112. The MPIO driver knows the VM unique ID 164, the process name, and the device ID from IO requests made by the processes, and reports the VM unique ID, process name, and device correlation information to the storage array 112 for inclusion in the process correlation data structure 142. As shown in FIG. 4, the process correlation data structure 142 thus contains an association between VM unique ID 164 and host 110 so that the process correlation data structure 142 can be used to ascertain which host 110 is supporting a given VM 166 at any point in time.

As an example, when ESX is used as the hypervisor 160 on a set of hosts 110, virtual machines 166 can move seamlessly from one physical host 110 to another. In an environment where there are 100s of hosts 110, for example, and thousands of virtual machines 166 are migrating between the hosts 110, it is difficult to know where each of the virtual machines 166 is located at a given point in time, and what each of the virtual machines 166 is doing. This likewise may occur when a hypervisor other than ESX is used. By including the location of the virtual machines 166 in the process correlation data structure 142, as well as the date the processes on the virtual machine 166 last accessed its associated device 130, it is possible to identify which virtual machine 166 has not accessed a device 130 recently and on which host 110 the virtual machine 166 currently resides.

Figure 5:
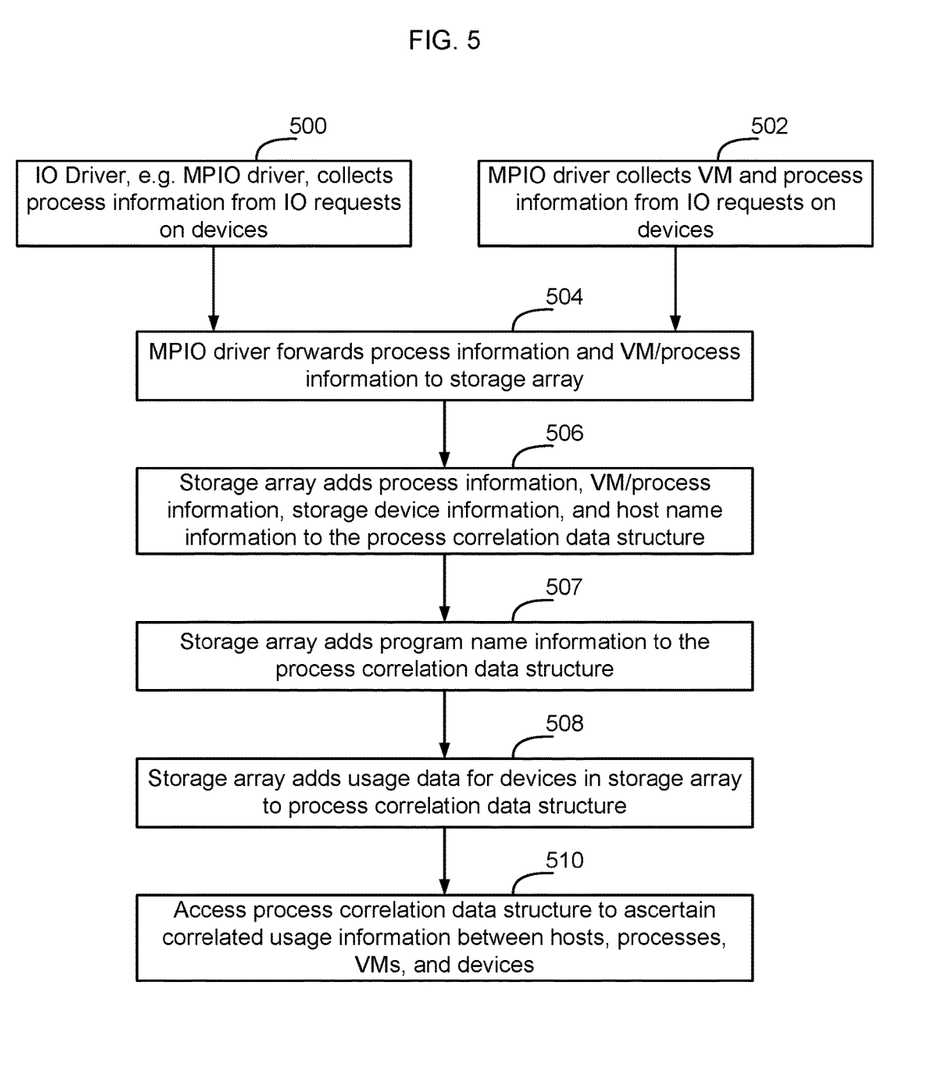
FIG. 5 is a flow chart of an example method of identifying process use on storage array resources according to an embodiment.

FIG. 5 shows an example process of identifying process use on storage array 112 resources according to an implementation. As shown in FIG. 5, the process includes collecting process information, by an IO driver such as a MPIO driver, from 10 requests on devices made by processes 136 running in user space 116 (500). Where the host supports one or more virtual machines, the process includes collecting VM and process information, by an IO driver such as a MPIO driver, from IO request on devices made by the processes running in the virtual machine (502).

The process includes forwarding the collected process information to the storage array 112 along with an identification of the host 110 on which the MPIO driver 132 is executing (504).

In one implementation, the MPIO driver 132 reports all processes 136 using a device 130 to the storage array 112 using a vendor unique SCSI LOG SELECT command, for all devices the host uses.

The LOG SELECT command provides a mechanism for an application client such as the MPIO driver 132 to manage statistical information maintained by the SCSI target device (storage array 1212) about the SCSI target device or its logical units. Structures in the form of log parameters within log pages are defined as a way to manage the log data. The LOG SELECT command provides for sending zero or more log pages via the Data-Out Buffer. By using a vendor unique SCSI LOG SELECT command the MPIO driver 132 is able to forward log pages containing process/device correlation information 140 to the storage array 112.

The storage array 112 collects process names 146 using the storage array devices 130, from various hosts/MPIO drivers 132, and adds the process names 146, host names 150, and the device information 144 specifying which devices are used by the processes to the process correlation data structure (506). The storage array 112 also saves the latest date the device 130 was used and updates the date information 152 in the process correlation data structure (508). In one implementation the storage array 112 updates the date information 152 daily, and will update an entry for a particular device 130 if the device 130 was read/write accessed in the last 24 hours. In other implementations the date information 152 may be updated at other frequency intervals. The process correlation data structure 142 can then be accessed to ascertain correlated usage information between hosts 110, processes 136, and devices 130 (510).

Where the host 110 has one or more virtual machines 166 executing on the host 110, the MPIO driver 132 collects virtual machine (VM) information of the VMs 166 executing on the host 110 (502) as well as the process information of processes executing on the virtual machine. The MPIO driver 132 forwards the VM and VM/process information to the storage array 112 (504), e.g. using a vendor unique SCSI LOG SELECT command. The storage array adds the VM/process information, host name information 150, and the device information 144 specifying which devices are used by the processes, to the process correlation data structure 142 (506). The storage array 112 also adds date information 152 for devices 130 used by the VMs 166 or processes 136 to the process correlation data structure 142 (508). The storage array 112 adds application name information 148 to the process correlation data structure 142 based on the name of the process 136 or based on information received from the host 110. The process correlation data structure 142 can then be accessed to ascertain correlated usage information between hosts 110, VMs 166, processes executing on the VMs, devices 130 (510) and the dates when the devices were last accessed.

In one implementation, the process correlation data structure 142 allows a user to query for processes using each device 130 and the last time the device 130 was used. This enables the storage administrator of the storage array 112 to figure out which devices 130 have not been used for a long time, and which devices 130 may be candidates for deletion or external backup. Because the storage administrator can also ascertain the process 136 that uses the device 130, the purpose of the device 130 may also be ascertained to enable the storage administrator to better assign the device 130 a service level objective. In the case of virtual machines, the location (host 110) on which the virtual machine 166 is executing is able to be ascertained and the last time the virtual machine 166 accessed the device 130 to which it is assigned may be ascertained. This enables idle virtual machines 166 to be identified and located to facilitate shutting down virtual machines 166 that are no longer required.

The methods described herein may be implemented as software configured to be executed in control logic such as contained in a CPU of an electronic device such as a computer. In particular, the functions described herein may be implemented as sets of program instructions implemented utilizing programming techniques known to those of ordinary skill in the art that are stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible computer readable medium such as random access memory, a computer memory, a disk, or other storage medium. All such embodiments are intended to fall within the scope of the present invention.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation. Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. Accordingly, it is submitted that that the invention should not be limited to the described embodiments but rather should be limited only by the spirit and scope of the appended claims.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for implementing a method of identifying process use on storage array resources, the computer program comprising a set of instructions which, when executed by a computer, cause the computer to perform a method comprising the steps of:
   collecting, by an Input/Output (IO) driver executing in kernel space, a list of process names of processes executing in user space from IO requests by the processes;
   correlating, by the IO driver, the process names with storage devices used by the processes; and
   forwarding, by the IO driver to the storage array, process/device correlation information correlating the process names and devices used by the associated processes.

2. The non-transitory tangible computer readable storage medium of claim 1, wherein the IO driver is a Multi-Path Input/Output (MPIO) driver.

3. The non-transitory tangible computer readable storage medium of claim 1, wherein the step of forwarding comprises generating and transmitting a vendor unique LOG SELECT command.

4. The non-transitory tangible computer readable storage medium of claim 1, wherein the storage devices are logical volumes of data storage offered by the storage array.

5. The non-transitory tangible computer readable storage medium of claim 1, further comprising the step of collecting, by the IO driver, a list of Virtual Machines executing on the computer and processes executing on the virtual machines.

6. The non-transitory tangible computer readable storage medium of claim 1, further comprising correlating, by the IO driver, Virtual Machine IDs associated with the Virtual Machines, processes executing on the Virtual Machines, and storage devices used by the Virtual Machines; and
   forwarding, by the IO driver to the storage array, Virtual Machine/process/device correlation information correlating the Virtual Machine IDs, process names of the processes executing on the Virtual Machines, and the devices used by the processes executing on the Virtual Machines.

7. A non-transitory tangible computer readable storage medium having stored thereon a computer program for implementing a method of identifying process use on storage array resources, the computer program comprising a set of instructions which, when executed by a computer, cause the computer to perform a method comprising the steps of:
   receiving, by the storage array from hosts connected to the storage array, process/device correlation information identifying processes on the hosts and correlating the identified processes with storage devices offered by the storage array;
   adding the process/device correlation information to a process correlation data structure;
   adding host identification information to the process correlation data structure; and
   adding device use data to the process correlation data structure.

8. The non-transitory tangible computer readable storage medium of claim 7, further comprising deducing application names for processes based on the process information.

9. The non-transitory tangible computer readable storage medium of claim 7, further comprising the steps of receiving a query on the process correlation data structure; and outputting a query response to the query, the query response containing information derived from the process correlation data structure.

10. The non-transitory tangible computer readable storage medium of claim 9, wherein the query includes a query for devices not accessed for more than a query parameter number of days, and wherein the query response includes a selected subset of storage devices and corresponding host and process information for the selected subset of storage devices.

11. The non-transitory tangible computer readable storage medium of claim 7, further comprising receiving, by the storage array from the hosts connected to the storage array, Virtual Machine correlation information identifying Virtual Machines executing on the hosts and correlating the identified Virtual Machines with storage devices offered by the storage array, and adding the Virtual Machine/device correlation information to the process correlation data structure.

12. The non-transitory tangible computer readable storage medium of claim 11, wherein the Virtual Machine correlation information further comprises process information about processes executing on the Virtual Machines.

13. A method of identifying process use on storage array resources, comprising the steps of:

collecting, by an Input/Output (IO) driver executing in kernel space, a list of process names of processes executing in user space from IO requests by the processes;

correlating, by the IO driver, the process names with storage devices used by the processes; and forwarding, by the IO driver to the storage array, process/device correlation information correlating the process names and devices used by the associated processes.

14. The method of claim 13, wherein the IO driver is a Multi-Path Input/Output (MPIO) driver.

15. The method of claim 13, wherein the step of forwarding comprises generating and transmitting a vendor unique LOG SELECT command.

16. The method of claim 13, wherein the storage devices are logical volumes of data storage offered by the storage array.

17. The method of claim 13, further comprising the step of collecting, by the IO driver, a list of Virtual Machines executing on the computer and processes executing on the virtual machines.

18. The method of claim 13, further comprising correlating, by the IO driver, Virtual Machine IDs associated with the Virtual Machines, processes executing on the Virtual Machines, and storage devices used by the Virtual Machines; and forwarding, by the IO driver to the storage array, Virtual Machine/process/device correlation information correlating the Virtual Machine IDs, process names of the processes executing on the Virtual Machines, and the devices used by the processes executing on the Virtual Machines.

* * * * *

UNITED STATES PATENT AND TRADEMARK OFFICE
CERTIFICATE OF CORRECTION

PATENT NO. : 10,360,085 B1
APPLICATION NO. : 15/390949
DATED : July 23, 2019
INVENTOR(S) : Sanjib Mallick et al.

Page 1 of 1

It is certified that error appears in the above-identified patent and that said Letters Patent is hereby corrected as shown below:

In the Specification

Column 4, Line 24, change "1266" to --126B--
Column 4, Line 45, change "10" to --IO--
Column 6, Line 62, change "10" to --IO--

Signed and Sealed this
Tenth Day of September, 2019

Andrei Iancu
*Director of the United States Patent and Trademark Office*